United States Patent
Hancox

(10) Patent No.: US 9,121,491 B2
(45) Date of Patent: Sep. 1, 2015

(54) OIL SCAVENGE ARRANGEMENT

(71) Applicant: ROLLS-ROYCE PLC, London (GB)

(72) Inventor: Michael Richard Hancox, Herts (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 14/031,513

(22) Filed: Sep. 19, 2013

(65) Prior Publication Data

US 2014/0106922 A1   Apr. 17, 2014

(30) Foreign Application Priority Data

Oct. 12, 2012   (GB) .................................. 1218310.9

(51) Int. Cl.
*F16H 57/04* (2010.01)
*F02C 7/36* (2006.01)
*F16H 57/08* (2006.01)
*F16H 1/28* (2006.01)
*F01D 25/18* (2006.01)

(52) U.S. Cl.
CPC ............ *F16H 57/0424* (2013.01); *F01D 25/18* (2013.01); *F02C 7/36* (2013.01); *F16H 1/28* (2013.01); *F16H 57/043* (2013.01); *F16H 57/0409* (2013.01); *F16H 57/0486* (2013.01); *F16H 57/082* (2013.01); *F05D 2260/40311* (2013.01); *F16H 57/0404* (2013.01)

(58) Field of Classification Search
CPC ............ F16H 57/0421; F16H 57/0482; F16H 57/082; F16H 57/0486; F16H 57/043; F16H 57/0409; F16H 57/0424
USPC .................................................. 475/159, 331
See application file for complete search history.

(56) References Cited

U.S. PATENT DOCUMENTS

| | | | | | |
|---|---|---|---|---|---|
| 4,157,668 | A | * | 6/1979 | Fukuma et al. | 475/159 |
| 4,296,648 | A | * | 10/1981 | Okano et al. | 475/159 |
| 5,851,163 | A | | 12/1998 | Kawase et al. | |
| 6,039,667 | A | * | 3/2000 | Schunck et al. | 475/159 |
| 7,704,178 | B2 | * | 4/2010 | Sheridan et al. | 475/159 |
| 8,366,578 | B2 | * | 2/2013 | Zeirke et al. | 475/160 |
| 8,777,792 | B2 | * | 7/2014 | Imai et al. | 475/159 |
| 2003/0232694 | A1 | | 12/2003 | Buhrke | |
| 2013/0331222 | A1 | * | 12/2013 | Richards | 475/331 |

FOREIGN PATENT DOCUMENTS

CN   202040315 U   11/2011
WO   WO 2011/129110 A1   10/2011

OTHER PUBLICATIONS

British Search Report issued in British Patent Application No. 1218310.9 dated Feb. 3, 2013.
Feb. 10, 2014 European Search Report issued in European Application No. 13 18 5153.

* cited by examiner

*Primary Examiner* — Roger Pang
(74) *Attorney, Agent, or Firm* — Oliff PLC

(57) ABSTRACT

An epicyclic gearbox including: a sun gear, a ring gear, an array of planet gears that each mesh with the sun gear and the ring gear and rotate relative thereto, and a planet carrier that couples the planet gears in relative position to each other. The planet carrier includes interplanetary portions that are located between adjacent pairs of planet gears and have a first and a second circumferential surface facing each adjacent planet gear; and direction features on at least one of the circumferential surfaces that, in use, direct fluid ejected with a radial component from the planet gears and direct it with an axial component.

21 Claims, 5 Drawing Sheets

OIL SCAVENGE ARRANGEMENT

The present invention relates to an oil scavenge arrangement for an epicyclic gearbox. It finds particular utility for a planetary arrangement of epicyclic gearbox in which the sun gear is coupled to an input shaft, and the planet carrier precesses around the sun gear and is coupled to an output shaft.

It is known to lubricate and cool an epicyclic gearbox by introducing oil. In use the oil gets worked which raises its temperature and may also attract debris. It is therefore necessary to eject the oil and replace it with fresh oil regularly to prevent or reduce the risk of overheating and hydraulic lock.

It is known to eject oil from a star arrangement epicyclic gearbox, in which the planet carrier is fixed and the ring gear is coupled to an output shaft and precesses around the input sun gear. Typically the rotation of the ring gear generates sufficient centrifugal force to eject the oil from the gearbox.

It is beneficial to use a planetary arrangement of epicyclic gearbox in applications in which a large gear ratio is desirable but where weight and/or size of the gearbox is constrained. Disadvantageously, a planetary arrangement epicyclic gearbox does not have the centrifugal force to eject the oil because the ring gear does not rotate.

The present invention provides an oil scavenge arrangement for an epicyclic gearbox, particularly a planetary arrangement epicyclic gearbox, that seeks to address the aforementioned problems.

An epicyclic gearbox having a rotational axis, the gearbox comprising: a sun gear; a ring gear radially outwardly of the sun gear; an array of planet gears that each mesh with the sun gear and the ring gear and rotate relative thereto; a planet carrier that couples the planet gears in relative position to each other; wherein the planet carrier comprises: interplanetary portions that are located between adjacent pairs of planet gears and have a first and a second circumferential surface each facing an adjacent planet gear; and direction features on at least one of the circumferential surfaces that, in use, direct fluid ejected with a radial component from the planet gears and direct it with an axial component.

Advantageously this enables oil (or another fluid) to be ejected from the gearbox before it is overly worked. This reduces the risks of overheating, hydraulic lock and transferring debris into the gear mechanism.

The ring gear, sun gear and planet gears may each or all form a double helical gear, in which advantageously the end loads are balanced. Alternatively each gear may form a spur gear, for use in a turboprop gas turbine engine or other application. The ring gear may be formed in two portions which are arranged to abut axially.

The planet carrier may be arranged to precess about the sun gear in the same rotational sense. The ring gear may be stationary, in a planetary epicyclic gearbox arrangement. Alternatively the ring gear may precess in the opposite sense to the planet carrier and sun gear, in a differential gearbox arrangement. Generally the ring gear precesses much more slowly than the other gears and so there is insufficient centrifugal force generated to expel or eject oil from the gearbox without using the arrangement of the present invention.

The direction features may comprise vanes. The vanes may form a V-shape to efficiently capture all the ejected oil. The vanes may be straight or curved. Adjacent pairs of vanes may have the same spacing or different spacing. Adjacent pairs of curved vanes may have the same or different radii of curvature. Advantageously different oil flow and scavenge requirements can be accommodated by these arrangements.

The direction features may comprise at least one passage through the at least one circumferential surface.

The direction features may comprise an array of pins on the at least one circumferential surface.

The direction features may be coupled to an axial passage to transport fluid, in use, in an axial direction. The passage may be aligned in a different direction but having an axial component.

The gearbox may further comprise a windage shield. Advantageously the windage shield reduces windage caused by gear teeth passing close to the direction features on the interplanetary portions whilst enabling fluid to be captured and redirected by the present invention. The windage shield may comprise a permeable material. Alternatively the windage shield may comprise apertures. The apertures may comprise slots.

The gearbox may further comprise a collection manifold located axially forward of the planet carrier. The gearbox may additionally or alternatively comprise a collection manifold located axially rearward of the planet carrier.

The direction features on the first circumferential surface may differ from the direction features on the second circumferential surface. The first circumferential surface may face a portion of the adjacent planet gear which rotates towards the sun gear and the direction features on the first circumferential surface are angled from radially inwards towards axial. Preferably there are also direction features on the first circumferential surface that are angled from radially outwards towards axial to collect the oil that is directed radially outwards by the centrifugal force induced by rotation of the planet carrier. The second circumferential surface may face a portion of the adjacent planet gear which rotates towards the ring gear and the direction features on the second circumferential surface are angled from radially outwards towards axial. Advantageously the direction features can be optimised for the direction in which the gear teeth pass them and the directions in which the oil meets the circumferential surfaces.

There may be at least one direction feature on a radially inner surface of the interplanetary portion which faces the sun gear.

There may be at least three planet gears and the same number of interplanetary portions, preferably at least four planet gears and interplanetary portions.

The planet carrier may be coupled to an output shaft. The ring gear may additionally be coupled to a second output shaft, when it precesses.

The present invention also provides a gas turbine engine comprising a gearbox as described and a propeller gas turbine engine comprising a gearbox as described.

Any combination of the optional features is encompassed within the scope of the invention except where mutually exclusive.

The present invention will be more fully described by way of example with reference to the accompanying drawings, in which.

Figure 1:
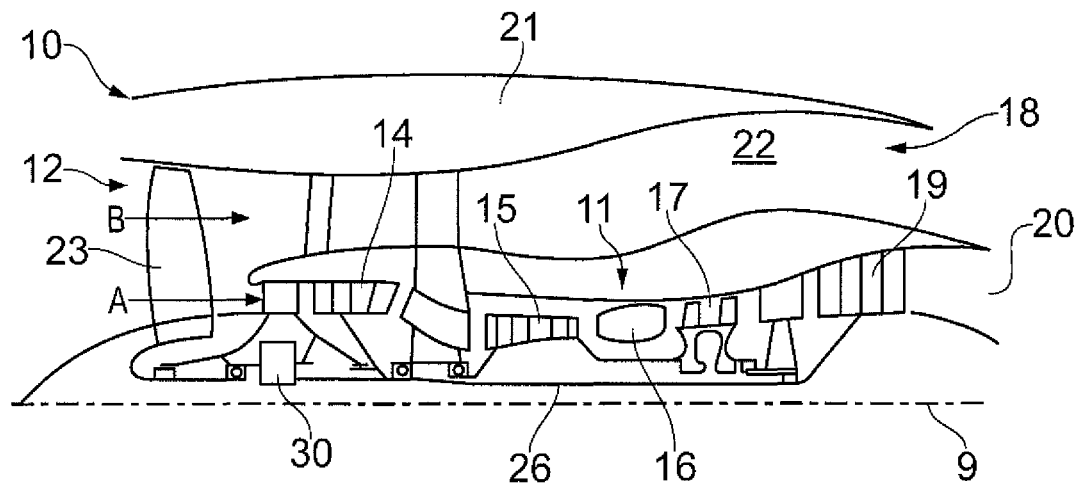
FIG. 1 is a sectional side view of a gas turbine engine having a geared fan.

Referring to FIG. 1, a two-shaft gas turbine engine 10 has a principal rotational axis 9. The engine 10 comprises an air intake 12 and a propulsive fan 23 that generates two airflows A and B. The gas turbine engine 10 comprises a core engine 11 having, in axial flow A, a low pressure booster compressor 14, a high pressure compressor 15, combustion equipment 16, a high pressure turbine 17, a low pressure turbine 19 and a core exhaust nozzle 20. A nacelle 21 surrounds the gas turbine engine 10 and defines, in axial flow B, a bypass duct 22 and a bypass exhaust nozzle 18. The fan 23 is attached to and driven by the low pressure turbine 19 via shaft 26 and epicyclic gearbox 30.

The gas turbine engine 10 works in a conventional manner so that air in the core airflow A is accelerated and compressed by the low pressure booster compressor 14 and directed into the high pressure compressor 15 where further compression takes place. The compressed air exhausted from the high pressure compressor 15 is directed into the combustion equipment 16 where it is mixed with fuel and the mixture combusted. The resultant hot combustion products then expand through, and thereby drive the high pressure and low pressure turbines 17, 19 before being exhausted through the nozzle 20 to provide some propulsive thrust. The high pressure turbine 17 drives the high pressure compressor 15 by a suitable interconnecting shaft. The fan 23 normally provides the majority of the propulsive thrust. The epicyclic gearbox 30 is a reduction gearbox.

Figure 2:
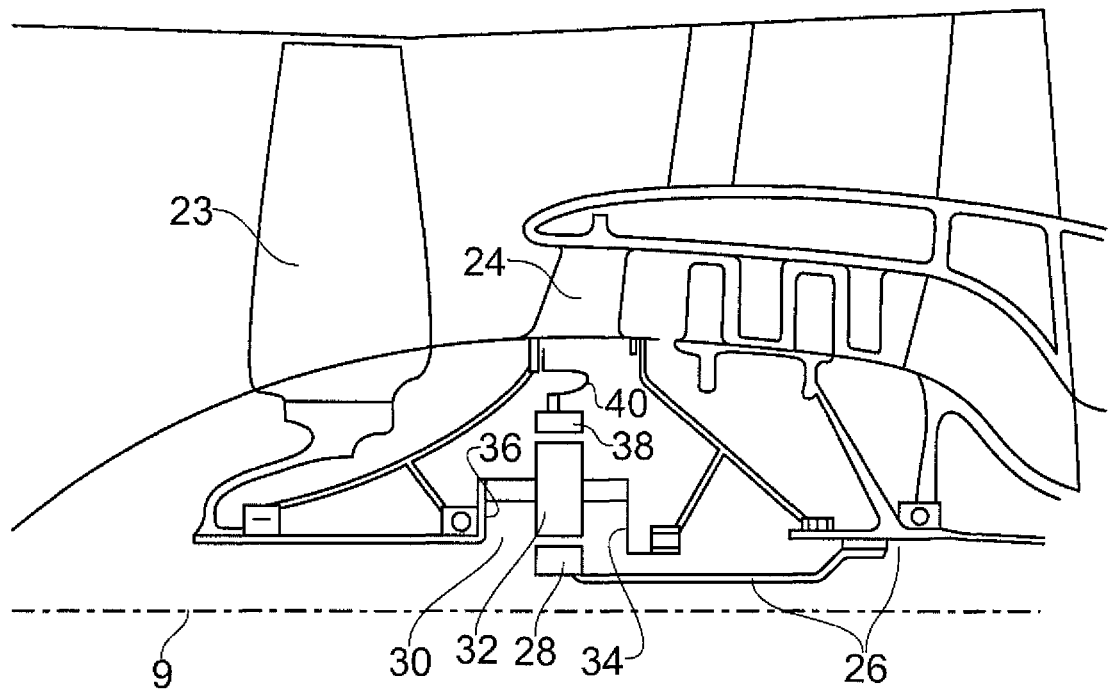
FIG. 2 is an enlargement of a planetary arrangement epicyclic gearbox used in the gas turbine engine of FIG. 1.

A known mechanical arrangement for a two-shaft geared fan gas turbine engine 10 is shown in FIG. 2. The low pressure turbine 19 drives the shaft 26, which is coupled to a sun wheel, or sun gear, 28 of the epicyclic gear arrangement 30. Radially outwardly of the sun gear 28 and intermeshing therewith, in conventional manner, is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis independently. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to stationary structure 24.

The epicyclic gearbox 30 is of the planetary type, in that the planet carrier 34 rotates about the sun gear 28 and is coupled to an output shaft, linkages 36. In other applications the gearbox 30 may be a differential gearbox in which the ring gear 38 also rotates in the opposite sense and is coupled to a different output shaft via linkages 40.

An epicyclic gearbox 30 must be lubricated, by oil or another fluid. However, the oil becomes heated by being worked during operation of the epicyclic gearbox 30. In addition, the oil may accumulate within the epicyclic gearbox 30 to an extent that causes hydraulic lock, particularly towards the bottom of the stationary ring gear 38 where oil collects under the influence of gravity. Furthermore, the oil may accumulate particulate debris from the components of the epicyclic gearbox 30 which may cause seizing or other problems. It is therefore necessary to eject the oil efficiently from the epicyclic gearbox 30 to allow its replacement by spraying in fresh, cool oil. Ejection of the oil, particularly when it is collected for cleaning before being returned to the reservoir from which fresh oil is supplied, is referred to as oil scavenge. The present invention is particularly concerned with an oil scavenge arrangement for an epicyclic gearbox 30 with a stationary ring gear 38 but may also find utility where the ring gear 38 rotates relatively slowly, for example in the differential gearbox of a contra-rotating propeller gas turbine engine.

Figure 3:
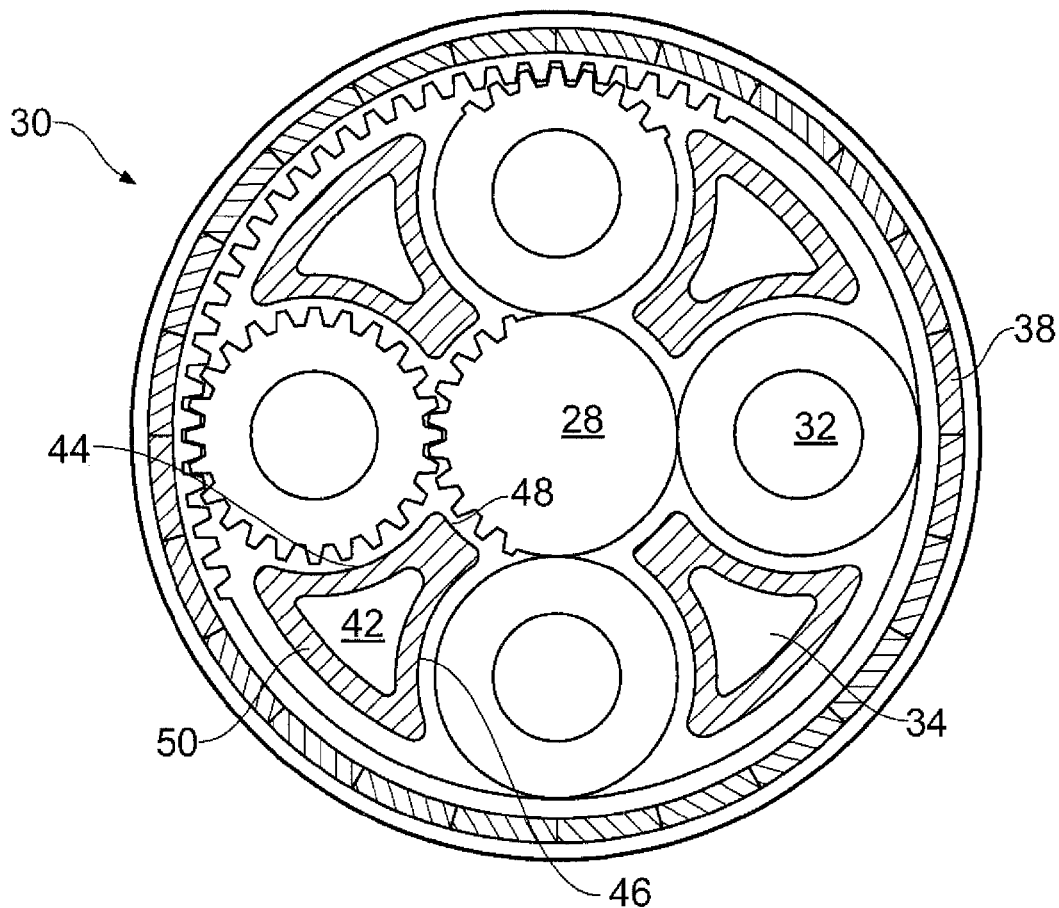
FIG. 3 is a schematic section through the planet carrier of an epicyclic gearbox according to the present invention.

An exemplary embodiment of the present invention is shown in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated although it will be apparent to the skilled reader that more or fewer planet gears 32 may be provided within the scope of the claimed invention. Practical applications of a planetary epicyclic gearbox 30 generally comprise at least three planet gears 32.

The planet carrier 34 of the present invention is generally circular or annular and has a diameter that is sufficient to couple to the centre of each of the planet gears 32. The planet carrier 34 comprises an array of interplanetary portions 42 that are positioned between each adjacent pair of planet gears 32. Each interplanetary portion 42 is based on a frusto-triangular or trapezoidal cross-section with the narrow part, the radially inner surface 48, being close to the sun gear 28 and the wide part, the radially outer surface 50, being close to the ring gear 38. Each interplanetary portion 42 is based on a prism, that is it has the same cross-section projected in the axial direction. It will be understood that there may be features on or in the interplanetary portion 42 that mean it is not a perfect prism. Each interplanetary portion 42 is further defined by a first circumferential surface 44 and a second circumferential surface 46. It is preferable that each of the first and second circumferential surfaces 44, 46 and the radially inner surface 48 are curved concavely to match the curve of the adjacent portions of the planet gears 32 and sun gear 28 respectively. Similarly it is preferable that the radially outer surface 50 is curved convexly to match the curve of the adjacent portion of the ring gear 38.

Figure 4:
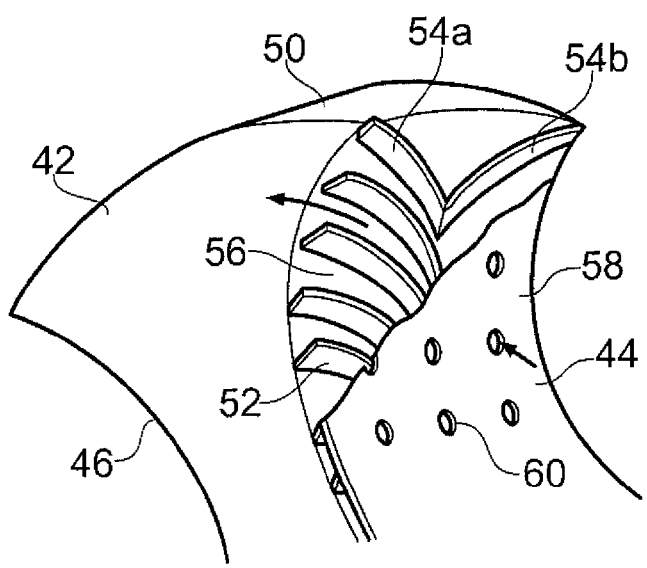
FIG. 4 is a perspective view of the interplanetary portion, partially cut away, according to the present invention.

The planet carrier 34 of the present invention comprises modifications to the first and second circumferential surfaces 44, 46. An interplanetary portion 42 according to the present invention is illustrated in FIG. 4. The first circumferential surface 44 is shown and described. The second circumferential surface 46 may comprise the same features as the first circumferential surface 44 or may differ as will be elaborated below with respect to FIG. 8. The first circumferential surface 44 comprises an array of direction features 52 in the form of vanes 54. A pair of vanes 54 may abut at one end to form a V-shape with the corner pointed towards the radially inner surface 48 of the interplanetary portion 42. The axially forward vane 54a thus extends at a given radius from the axial midline of the first circumferential surface 44 axially forwards and radially outwards whilst the axially rearward vane 54b extends from the same radius on the axial midline of the first circumferential surface 46 axially rearwards and radially outwards. The pairs of vanes 54a, 54b may each be identical to form a regular array or may be irregularly spaced. Alternatively one or more of the pairs of vanes 54a, 54b may form a different included angle. This may be to accommodate different oil flow into different regions; to take account of the curved surface of the first and second circumferential surfaces 44, 46 and its effects on the oil flow; to accommodate the different tip and hub speeds closer to the radially outer surface 50 and radially inner surface 48 respectively; to turn the oil flow to be more or less axial dependent on the proximity to the radially outer or radially inner surfaces 50, 48 respectively; to cause a pressure drop across a distance to promote more regular oil flow; or any other reason known to the skilled reader. The vanes 54a, 54b stand proud of the first circumferential surface 44 which may therefore have a recessed position relative to known interplanetary portions 42. Thus the circumferentially outer edge of the array of vanes 54a, 54b may form, discontinuously, the usual surface position of the interplanetary portion 42 relative to the adjacent planet gear 32.

Channels 56 are formed between radially spaced pairs of vanes 54a, 54b. Oil ejected from the adjacent planet gear 32 is directed into the channels 56 which then change the direction that the oil travels to substantially axially, that is with a component in the axial direction. A collection manifold (not shown) may be provided axially forward of the interplanetary portion 42 so that the oil directed along the channels 56 formed between axially forward vanes 54a can be collected in the collection manifold. Similarly a collection manifold may be provided, additionally or alternatively, axially rearward of the interplanetary portion 42 so that the oil directed along the channels 56 formed between axially rearward vanes 54b can be collected. From the collection manifolds the oil may be filtered, cleaned, cooled and returned to the oil supply reservoir to be resupplied to the components of the epicyclic gearbox 30 in due course.

Advantageously, the direction features 52 and channels 56 therebetween result in worked oil being ejected approximately axially from the epicyclic gearbox 30 as the planet carrier 34 precesses around the input sun gear 28 so that the risks from overheating and hydraulic locking are reduced. Fresh oil, which will be cooler than worked oil, can be sprayed into the epicyclic gearbox 30 to replace that which is ejected so that an approximately constant quantity of oil is present that is sufficient to lubricate the components as required.

Also illustrated in FIG. 4 is a windage shield 58, partially cut away, which is a thin sheet located on the circumferential edges of the direction features 52 to form a smooth surface past which the teeth of the adjacent planet gear 32 rotate. The windage shield 58 acts to reduce or eliminate the windage effects of the teeth of the planet gear 32 dragging oil across the openings to the stationary channels 56 and causing it to churn and thereby acquire heat. The windage shield 58 comprises an array of apertures 60 through which oil ejected circumferentially from the planet gear 32 passes. Each of the apertures 60 is aligned with one of the channels 56 so that the oil is efficiently captured and directed along the channel 56. The windage shield 58 acts to close the fourth side of each channel 56, except for the apertures 60. The apertures 60 may have any suitable cross-section. For example, they may be annular borings through the windage shield 58 or they may be slot shaped. If slot-shaped, each may be angled at the same angle as the channel 56 to which it supplies scavenged oil. The apertures 60 may also have a tapered cross-sectional shape to match the oil ejection profile from the planet gears 32. The apertures 60 may be arranged in a regular or an irregular array. They may be arranged randomly across the windage shield 58 although this may result in apertures 60 that do not coincide with the channels 56. Alternatively, the windage shield 58 may be permeable, in which case no apertures 60 are required.

The windage shield 58 may be attached to each direction feature 52 or only selected ones of the direction features 52. It may also comprise a lip at its radially inner and radially outer edges to close the channels 56 that open at these edges. Alternatively the windage shield 58 may abut or be attached to a separate flange that closes these areas to fluid passage.

Figure 5:
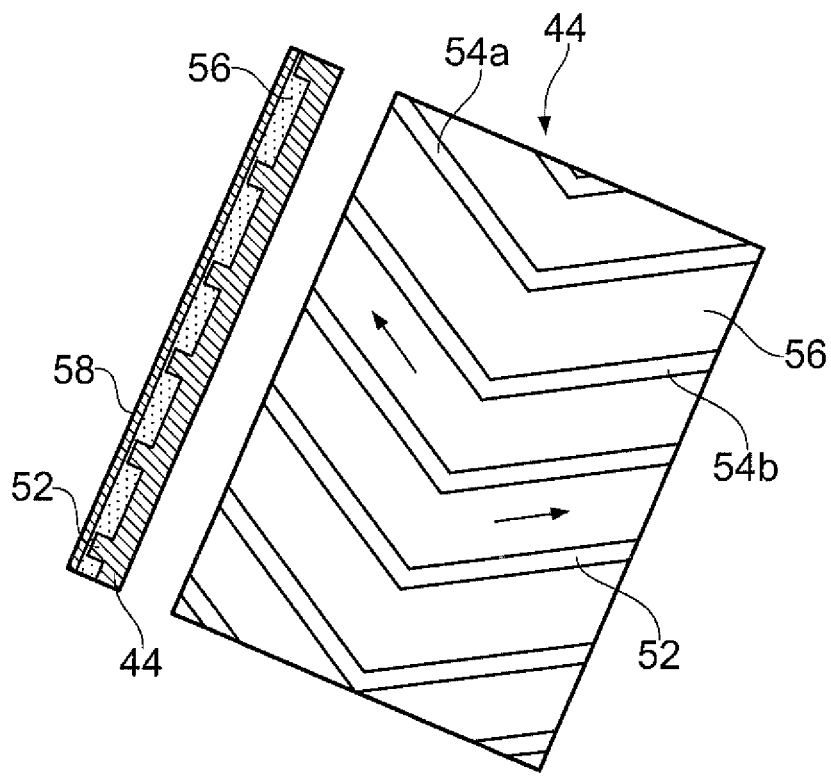
FIG. 5 is a view in the circumferential direction, and a cross-section thereof, of the interplanetary portion according to the present invention.

As illustrated in FIG. 4, the vanes 54a, 54b are curved which advantageously provides a smooth transition between radial and axial direction for the oil flow. Alternatively the vanes 54a, 54b may be straight as illustrated in FIG. 5 so that the oil is more quickly directed out of the epicyclic gearbox 30. This may be easier to implement in an axially short planet carrier 34 where the angle of each vane 54a, 54b relative to the radial direction need not be excessively small. It can be clearly seen in FIG. 5 that the channels 56 have significantly greater radial width than the vanes 54a, 54b so that the majority of the surface area of the first circumferential surface 44 comprises channels 56. This enables a greater quantity of oil to be scavenged.

Figure 6:
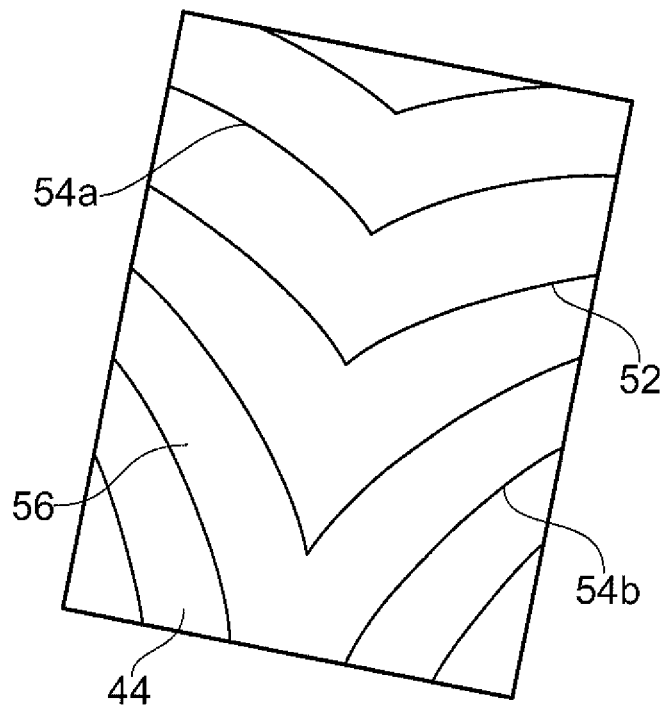
FIG. 6 is a view in the circumferential direction of another interplanetary portion according to the present invention.

The curvature of radially adjacent vanes 54a, 54b may change such that the radius of curvature of vanes 54a, 54b nearer to the sun gear 28 is smaller than the radius of curvature of vanes 54a, 54b nearer to the ring gear 38. This is illustrated in FIG. 6. Thus at the axially forward or rearward edge of the interplanetary portion 42, the radial width of the channels 56 nearer to the sun gear 28 will be larger than the radial width of the channels 56 nearer to the ring gear 38. Alternatively, the curvature of radially adjacent vanes 54a, 54b may change such that the radius of curvature of vanes 54a, 54b nearer to the sun gear 28 is larger than the radius of curvature of vanes 54a, 54b nearer to the ring gear 38.

Alternatively, each pair of vanes 54a, 54b may be identical in orientation but the radial spacing between adjacent pairs of vanes 54a, 54b may differ to form an irregular array.

The vanes 54 may form a parallel array rather than pairs forming V-shapes. In this case only one collection manifold is required, at one axial end of the interplanetary portion 42, to receive the collected oil that has passed along the channels 56. Similarly, the vanes 54 may be curved or straight and the radial spacing may be equal or irregular.

Figure 7:
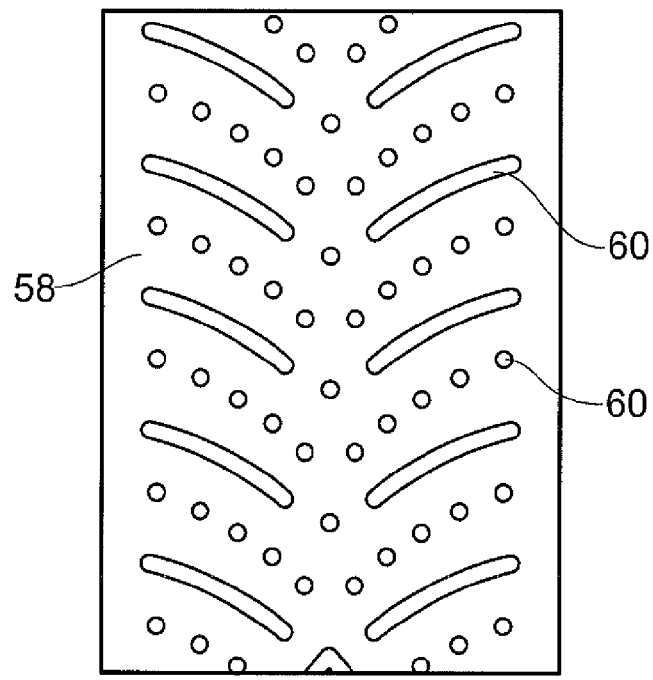
FIG. 7 is a circumferential view of a windage shield according to the present invention.

FIG. 7 illustrates an alternative arrangement of the windage shield 58 in which the apertures 60 comprise a mixture of annular bores and slots. As will be apparent to the skilled reader, the precise arrangement of apertures 60 including the sizes, shapes and relative locations will be dependent upon the application contemplated for the present invention and will depend, among other factors, on the relative rotational speeds of the planet gears 32 and the planet carrier 34, the quantity of oil supplied to the epicyclic gearbox 30 and requiring scavenging, and the operating environment including the viscosity and temperature of the oil and the ambient temperature of the epicyclic gearbox 30.

Figure 8:
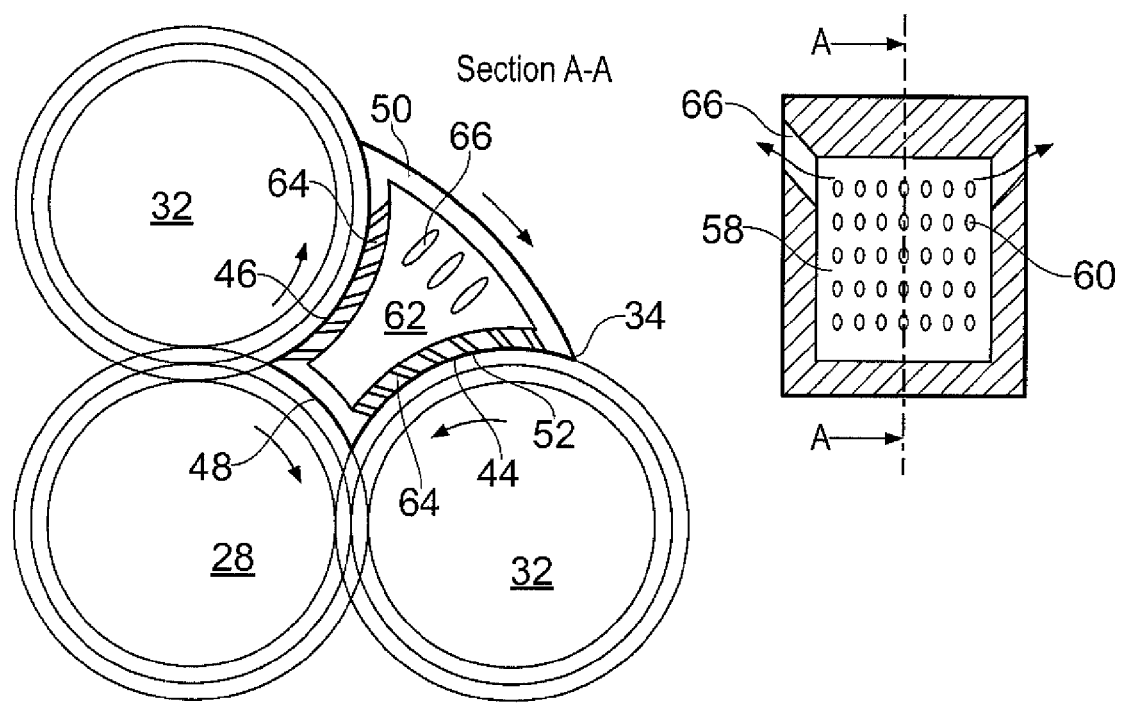
FIG. 8 is a schematic sectional view of part of a planetary arrangement epicyclic gearbox according to the present invention and a circumferential section of an interplanetary portion.

FIG. 8 shows an alternative embodiment of the interplanetary portion 42 and its location between two planet gears 32 and the sun gear 28. In this embodiment the interplanetary portion 42 is hollow and defines a cavity 62 to receive oil ejected from the planet gears 32 that is to be scavenged. The direction features 52 comprise passages 64 that pass through the walls of the interplanetary portion 42. Each planet gear 32 is illustrated as rotating anticlockwise about its own axis. This means that the teeth of one planet gear 32 travel substantially radially inwardly, passing close to the first circumferential surface 44 of the interplanetary portion 42, whilst the teeth of the other planet gear 32 travel substantially radially outwardly, passing close to the second circumferential surface 46. Each passage 64 through the first circumferential surface 44 is thus angled such that the end closer to the planet gear 32 is radially outward of the end opening into the cavity 62 so that oil is easily propelled through the passage 64 and into the cavity 62 by the rotation of the planet gear 32. Conversely, each passage 64 through the second circumferential surface 46 is angled such that the end closer to the planet gear 32 is radially inward of the end opening into the cavity 62. In this way, the direction features 52 on the first circumferential surface 44 are different to the direction features 52 on the second circumferential surface 44.

Preferably there are also direction features 52 on the first circumferential surface 44 that are angled from radially outwards towards axial to collect the oil that is directed radially outwards by the centrifugal force induced by rotation of the planet carrier 34. Thus the first circumferential surface 44 comprises direction features 52 that are angled in two or more directions to efficiently capture and redirect oil that is propelled from the planet gears 32.

The windage shield 58 may be provided for this embodiment to reduce the windage effects of the teeth of the planet gears 32 passing the passages 64, although it is unlikely to be necessary. The windage shield 58 may be permeable or may comprise apertures 60. Preferably the apertures 60 are sized and located to substantially coincide with the openings of the passages 64 through the first and second circumferential surfaces 44, 46.

The interplanetary portion 42 in this embodiment may comprise means to pass the scavenged oil axially forward, rearward or both into one or more collection manifolds from whence the scavenged oil can be cleaned, cooled and returned to the supply reservoir. In this case further ejection apertures 66 may be provided to direct oil collected radially outwards in the cavity 62 in a direction having an axial component. The oil may also be directed through the radially outer surface 50 towards the ring gear 38 in order to provide refreshed lubricant to the components of the epicyclic gearbox 30. The interplanetary portion 42 may comprise means to clean and cool the scavenged oil within the cavity 62 where practicable.

Figure 9:
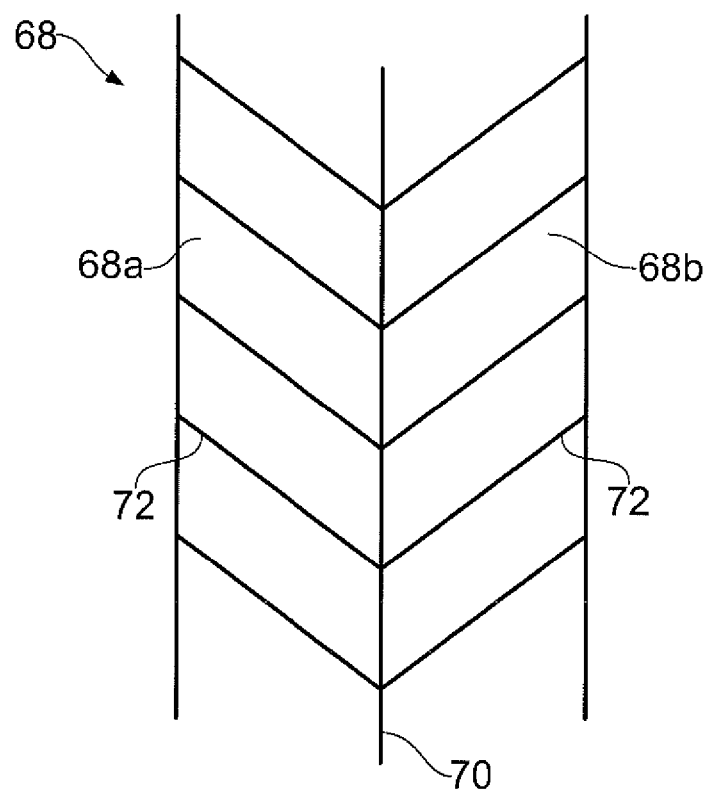
FIG. 9 is a schematic view of a gear having helical teeth which can be used in accordance with the present invention.

In preferred embodiments of the present invention, the ring gear 38, each planet gear 32 and the sun gear 28 each comprise two axial portions that are mirror images of each other and abut in the axial plane to form the gear. An exemplary gear 68 of this type is shown in FIG. 9. The gear 68 comprises first and second portions 68a, 68b that abut at an abutment line 70. Each portion 68a, 68b comprises helical gear teeth 72 that intermesh with the teeth of the adjacent gears. It is preferable that the axial length of the portions 68a, 68b are equal as the end loads on the gear 68 are thereby balanced. However, in some applications of the epicyclic gearbox 30 of the present invention it may be beneficial for the portions 68a, 68b to have different axial lengths and to thereby manage stresses induced by axial end loads and/or to minimise the stress on the gear teeth 72 by lengthening them.

It is beneficial to form the ring gear 38, and potentially the sun gear 28 and planet gears 32, in two axial portions 68a, 68b to aid assembly of the epicyclic gearbox 30. Optionally the two portions of the ring gear 38 may be bonded or otherwise securely coupled together instead of simply abutting together. Abutting is secure because the meshing of the helical gear teeth 72 with the teeth of the planet gears 32 forces the two portions of the ring gear 38 into axial abutment.

Where the planet gears 32 are formed of two axial portions 68a, 68b it is advantageous to arrange the V-shaped vane pairs 54a, 54b so that the corner of the V substantially coincides with the abutment line 70. This maximises the quantity of oil that is scavenged by the epicyclic gearbox 30 of the present invention.

An alternative arrangement of direction features 52, which is not illustrated, comprises an array of pins or rods that acts to change the flow direction of oil ejected from the planet gears 32 to be substantially axially where it can be conveniently collected, cleaned, cooled and returned to the oil supply reservoir.

The planet carrier 34, and in particular the interplanetary portions 42, may comprise one or more cavities to lighten the planet carrier 34 and thus the whole epicyclic gearbox 30. Similarly other components of the epicyclic gearbox 30 may comprise apertures or cavities to lighten the components.

The ring gear 38, sun gear 28 and planet gears 32 may be spur gears, having teeth extending parallel to the axis of rotation. Long spur gears which will obtain the benefit of the present invention are relevant to gears for turboprop gas turbine engines.

Although it is generally preferable that the corner of a V-shaped pair of vanes 54a, 54b is axially central, since the end loads are thereby balanced, the benefits of the invention are also realised with the corner of a V-shaped pair of vanes 54a, 54b that is not axially central between the front and rear edges of the interplanetary portion 42 of the planet carrier 34. Similarly, the vanes 54a, 54b or other direction features 52 may be arranged in more complex patterns to achieve additional benefits from the invention.

The channels 56 or passages 64 may optionally be filled or partially filled with permeable foam filler. In this case the windage shield 58 is unnecessary as the foam filler presents a substantially smooth surface to the passing gear teeth. Alternatively a shield that is similar to the windage shield 58 may be provided to retain the foam filler within the channels 56 or passages 64 against the centrifugal forces. The foam may additionally act to clean the scavenged oil as it behaves as a filter.

Figure 10:
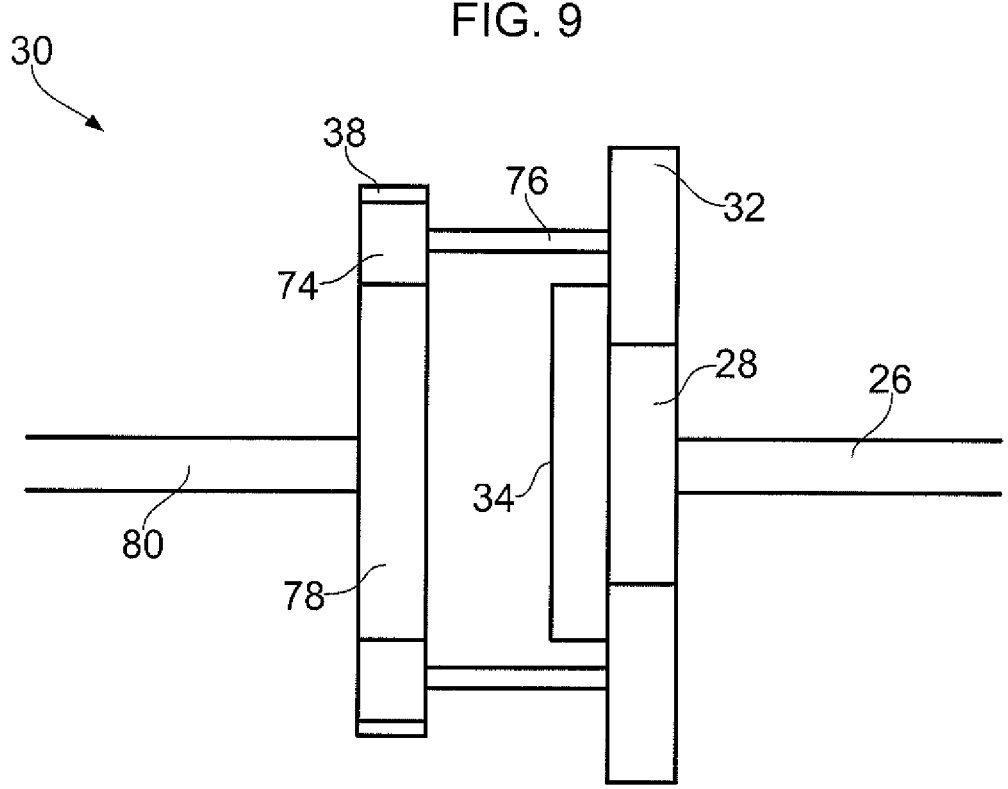
FIG. 10 is a schematic view of a gearbox having two axial planes.

FIG. 10 illustrates an alternative form of epicyclic gearbox 30 to which the present invention may be applied with felicity. The epicyclic gearbox 30 shown is exemplary of many different gearbox arrangements having more than one axial plane of gears. As illustrated, the input shaft 26 is coupled to the sun gear 28 around which are a plurality of planet gears 32 that are held in relative position by a non-rotating planet carrier 34. Each planet gear 32 is coupled to secondary planet 74 by a coupling 76, the secondary planets 74 having a different diameter to the planet gears 32. The secondary planets 74 mesh with a secondary sun 78 which has a different diameter to the sun gear 28. Interplanetary portions 42 according to the present invention are provided between the planet gears 32. They may also be provided between the secondary planets 74.

The secondary sun 78 is coupled to an output shaft 80. Due to the difference in the diameters of the gears, the output is at a different ratio to the input than is the case for an epicyclic gearbox on a single axial plane, whilst the gearbox 30 has the same radial extent. The ring gear 38 is located in the axial plane with the secondary sun 78 and the secondary planets 74. It meshes with the secondary planets 74.

Alternatively, the output shaft 80 may be coupled to the ring gear 38 instead of the secondary sun 78. In this case the secondary sun 78 may be omitted.

Other arrangements of gearbox having two axial planes may also benefit from the interplanetary portions of the present invention. For example, the planet carrier 34 may precess and the ring gear 38 be stationary.

Although the epicyclic gearbox oil scavenge arrangement of the present invention has been described with reference to a planetary epicyclic gearbox 30 for a geared fan gas turbine engine 10, it finds utility in other applications. For example, it may be used for a gas turbine engine 10 with a single propeller driven from the planet carrier 34; or it may be used for another type of engine driving a single propeller such as a helicopter, turboprop, wind turbine or tidal turbine. The oil scavenge arrangement may be used in an accessory gearbox of the epicyclic type. Alternatively the oil scavenge arrangement may be used in a differential type of epicyclic gearbox for a contra-rotating propeller gas turbine engine or other application. Alternatively the oil scavenge arrangement may be used in an epicyclic gearbox 30 used in another type of machinery incorporating a high speed gearbox which will naturally indicate use of a double helical tooth arrangement. The invention finds particular utility where the design of the gears gives the potential or tendency for oil to pool in greater quantities than can be dispersed by gravity.

The invention claimed is:

1. An epicyclic gearbox having a rotational axis, the gearbox comprising:
   a sun gear;
   a ring gear radially outward of the sun gear;
   an array of planet gears that each mesh with the sun gear and the ring gear and rotate relative thereto;
   a planet carrier that couples the planet gears in relative position to each other; wherein the planet carrier comprises:
   interplanetary portions that are each located between adjacent pairs of the planet gears and that each have a first and a second circumferential surface, each of the first and second circumferential surfaces facing an adjacent one of the planet gears; and
   direction features on at least one of the circumferential surfaces that, in use, direct fluid ejected with a radial component from the planet gears and direct it substantially in an axial direction of the gearbox.

2. A gearbox as claimed in claim 1, wherein the planet carrier is arranged to precess about the sun gear in the same rotational sense.

3. A gearbox as claimed in claim 1, wherein the ring gear is arranged to precess around the sun gear in the opposite rotational sense to the sun gear.

4. A gearbox as claimed in claim 1, wherein the direction features comprise (i) vanes, (ii) at least one passage through the at least one circumferential surface, or (iii) an array of pins on the at least one circumferential surface.

5. A gearbox as claimed in claim 4, wherein the vanes form a V-shape.

6. A gearbox as claimed in claim 5, wherein the vanes are straight or curved.

7. A gearbox as claimed in claim 1, wherein the direction features are coupled to an axial passage to transport fluid, in use, in the axial direction.

8. A gearbox as claimed in claim 1, further comprising a windage shield.

9. A gearbox as claimed in claim 8, wherein the windage shield comprises a permeable material.

10. A gearbox as claimed in claim 8, wherein the windage shield comprises apertures.

11. A gearbox as claimed in claim 10, wherein the apertures comprise slots.

12. A gearbox as claimed in claim 1, further comprising at least one of a collection manifold located axially forward of the planet carrier and a collection manifold located axially rearward of the planet carrier.

13. A gearbox as claimed in claim 1, wherein wherein:
   the direction features are on the first and the second circumferential surfaces; and
   the direction features on the first circumferential surface differ from the direction features on the second circumferential surface.

14. A gearbox as claimed in claim 13, wherein:
   the first circumferential surface faces a portion of the adjacent planet gear which rotates towards the sun gear; and
   the direction features on the first circumferential surface are angled from radially inwards towards axial.

15. A gearbox as claimed in claim 13, wherein:
   the second circumferential surface faces a portion of the adjacent planet gear which rotates towards the ring gear; and
   the direction features on the second circumferential surface are angled from radially outwards towards axial.

16. A gearbox as claimed in claim 1, wherein each of the interplanetary portions further comprises at least one direction feature on a radially inner surface which faces the sun gear.

17. A gearbox as claimed in claim 1, wherein the planet carrier is coupled to an output shaft.

18. A gearbox as claimed in claim 17, wherein the ring gear is coupled to a second output shaft.

19. A gas turbine engine comprising a gearbox as claimed in claim 1.

20. A propeller gas turbine engine comprising a gearbox as claimed in claim 1.

21. A gearbox as claimed in claim 1, wherein the direction features direct the fluid so that the fluid is ejected from the interplanetary portion.

* * * * *